(12) United States Patent
Salter et al.

(10) Patent No.: US 9,914,390 B1
(45) Date of Patent: Mar. 13, 2018

(54) VEHICLE SHADE ASSEMBLY

(71) Applicant: Ford Global Technologies, LLC, Dearborn, MI (US)

(72) Inventors: Stuart C. Salter, White Lake, MI (US); Annette Lynn Huebner, White Lake, MI (US); Kristin Ann Hellman, Walled Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/297,442

(22) Filed: Oct. 19, 2016

(51) Int. Cl.
| | |
|---|---|
| *B60Q 1/00* | (2006.01) |
| *B60Q 1/26* | (2006.01) |
| *B60Q 3/02* | (2006.01) |
| *B60J 1/20* | (2006.01) |
| *B60Q 3/00* | (2017.01) |
| *F21V 9/16* | (2006.01) |
| *F21V 14/00* | (2018.01) |
| *F21K 2/00* | (2006.01) |
| *G02B 5/128* | (2006.01) |
| *F21Y 115/10* | (2016.01) |

(52) U.S. Cl.
CPC .......... *B60Q 3/0243* (2013.01); *B60J 1/2041* (2013.01); *B60J 1/2047* (2013.01); *B60Q 3/008* (2013.01); *B60Q 3/0203* (2013.01); *B60Q 3/0293* (2013.01); *F21K 2/00* (2013.01); *F21V 9/16* (2013.01); *F21V 14/006* (2013.01); *G02B 5/128* (2013.01); *B60Q 2500/00* (2013.01); *F21Y 2115/10* (2016.08)

(58) Field of Classification Search
CPC ....... B60J 1/2041; B60J 1/2047; B60Q 3/008; B60Q 3/0203; B60Q 3/0243; B60Q 3/0293; B60Q 3/20; B60Q 3/208; B60Q 2500/00; B60Q 3/10; F21K 2/00; F21V 9/16; F21V 14/006; G02B 5/128
USPC ......... 362/488, 492–493, 503–504, 509–510
See application file for complete search history.

(56) References Cited

U.S. PATENT DOCUMENTS

| | | | |
|---|---|---|---|
| 2,486,859 | A | 11/1949 | Meijer et al. |
| 4,818,007 | A | 4/1989 | Mahoney |
| 5,053,930 | A | 10/1991 | Benavides |
| 5,434,013 | A | 7/1995 | Fernandez |
| 5,709,453 | A | 1/1998 | Krent et al. |
| 5,839,718 | A | 11/1998 | Hase et al. |
| 5,962,121 | A * | 10/1999 | Mori ............... G02B 5/128 428/323 |
| 6,031,511 | A | 2/2000 | DeLuca et al. |
| 6,117,362 | A | 9/2000 | Yen et al. |
| 6,419,854 | B1 | 7/2002 | Yocom et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

A vehicle is provided which includes a headliner including a retaining member. A window and a shade assembly is positioned proximate the window. The shade assembly includes a housing and a shade. The shade is configured to deploy from the housing. An engaging member is positioned on the shade and is configured to couple with the retaining member. A photoluminescent structure is positioned on the shade.

17 Claims, 8 Drawing Sheets

(56) References Cited

U.S. PATENT DOCUMENTS

| | | |
|---|---|---|
| 6,494,490 B1 | 12/2002 | Trantoul |
| 6,569,786 B1 | 5/2003 | Marsh |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,776,211 B2 | 8/2004 | Schlect et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,128,439 B2 | 10/2006 | Winsor |
| 7,161,472 B2 | 1/2007 | Strumolo et al. |
| 7,213,923 B2 | 5/2007 | Liu et al. |
| 7,216,917 B2 | 5/2007 | Tadakamalla |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,717,158 B2 | 5/2010 | Lekar et al. |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | La Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,652,641 B2 | 2/2014 | Wang et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formosa |
| 2002/0195843 A1 | 12/2002 | Glasl |
| 2003/0167668 A1 | 9/2003 | Fuks et al. |
| 2003/0179548 A1 | 9/2003 | Becker et al. |
| 2004/0120045 A1 | 6/2004 | Haines |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2010/0224831 A1 | 9/2010 | Woo et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1* | 6/2017 | Schuett .................. B60Q 3/208 |

FOREIGN PATENT DOCUMENTS

| | | | |
|---|---|---|---|
| CN | 201193011 Y | | 2/2009 |
| CN | 204127823 U | | 1/2015 |
| DE | 4120677 A1 | | 1/1992 |
| DE | 29708699 U1 | | 7/1997 |
| DE | 10319396 A1 | | 11/2004 |
| EP | 1793261 A1 | | 6/2007 |
| EP | 2778209 A1 | | 9/2014 |
| JP | 2000159011 A | | 6/2000 |
| JP | 2007238063 A | | 9/2007 |
| KR | 20060026531 A | | 3/2006 |
| WO | 2006047306 A1 | | 5/2006 |
| WO | 2014068440 A1 | | 5/2014 |
| WO | 2014161927 A1 | | 10/2014 |
| WO | WO 2015189178 A1 * | 12/2015 | ............ B60J 7/0007 |

* cited by examiner

US 9,914,390 B1

VEHICLE SHADE ASSEMBLY

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present disclosure, a vehicle is provided which includes a headliner including a retaining member. A window and a shade assembly is positioned proximate the window. The shade assembly includes a housing and a shade. The shade is configured to deploy from the housing. An engaging member is positioned on the shade and is configured to couple with the retaining member. A photoluminescent structure is positioned on the shade.

According to another aspect of the present disclosure, a vehicle includes a window. A shade assembly is positioned proximate the window. The shade assembly includes a housing. A shade is configured to deploy from the housing. A photoluminescent structure is positioned on the shade.

According to yet another aspect of the present disclosure, a shade assembly for a vehicle includes a housing, a shade configured to deploy from the housing, and a photoluminescent structure positioned on the shade.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1A:
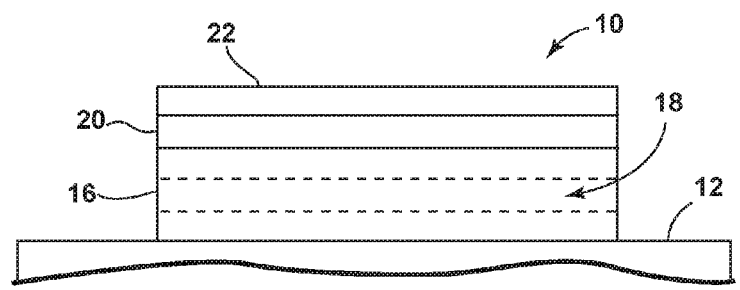
FIG. 1 A is a side view of a photoluminescent structure rendered as a coating for use in a trim assembly according to one example.
FIG. 1B is a top view of a photoluminescent structure rendered as a discrete particle according to one example.
FIG. 1C is a side view of a plurality of photoluminescent structures rendered as discrete particles and incorporated into a separate structure.
Figure 1B:
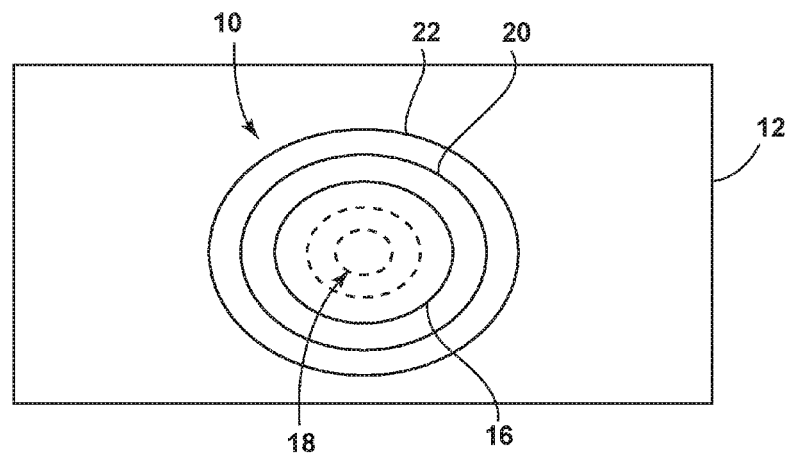
Figure 1C:
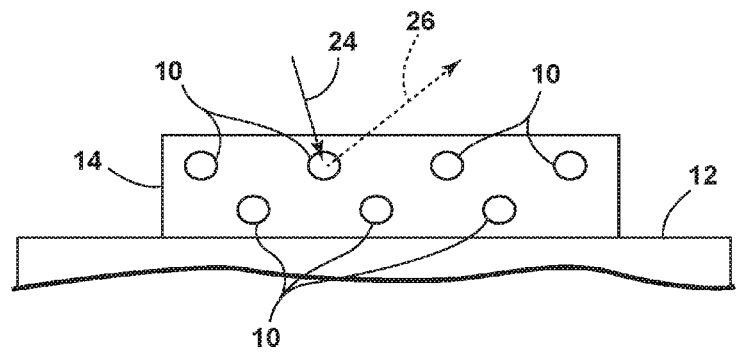
Figure 2:
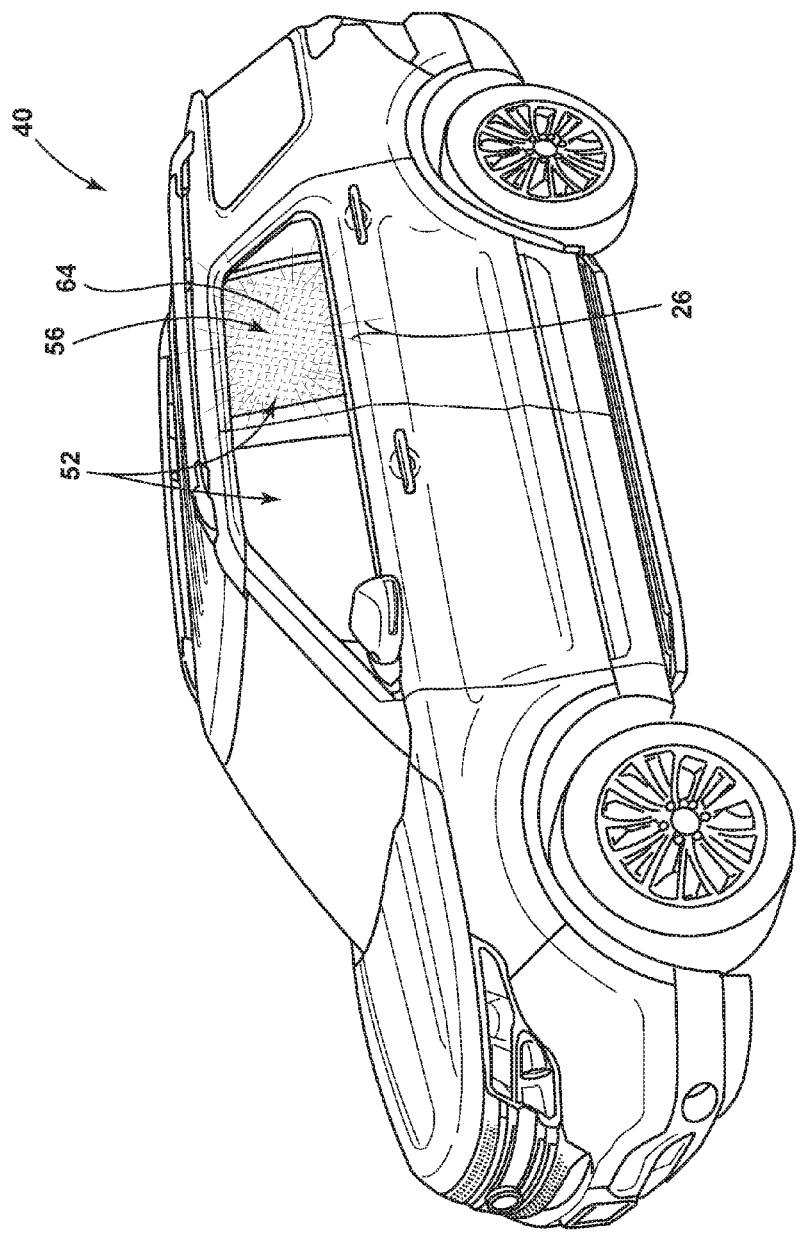
FIG. 2 is a front perspective view of a vehicle equipped with a shade assembly, according to one example.

Referring to FIGS. 1A-1C, various exemplary embodiments of photoluminescent structures 10 are shown, each capable of being coupled to the substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by the sun, ambient sources and/or a light source 84 (FIG. 8A) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to the substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into the substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various examples discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one example, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to one example, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some examples, the rare earth aluminum garnet type Ce phosphor may serve as the photoluminescent material 18 with ultra-short persistence characteristics, which can emit the converted light 26 by absorbing purple to blue excitation light 24 emitted from a light source 84 and/or ambient sources. According to one example, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one example, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source 84). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one example, may be operable to emit light at or above an intensity of 0.32 $mcd/m^2$ after a period of 10 minutes. Additionally, the long persistence photoluminescent material 18 may be operable to emit light above or at an intensity of 0.32 $mcd/m^2$ after a period of 30 minutes and, in some examples, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources 84 that emits the excitation light 24, including, but not limited to, natural light sources (e.g., the sun) and/or any artificial light source 84. The periodic absorption of the excitation light 24 from any excitation source may provide for a substantially sustained charge of the long persistence photoluminescent material 18 to provide for consistent passive illumination. In some examples, a light sensor may monitor the illumination intensity of the photoluminescent structure 10 and actuate an excitation source when the illumination intensity falls below 0.32 $mcd/m^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one example, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one example, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d–d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Referring now to FIGS. 2-6, a vehicle 40 is depicted which includes a headliner 44 having a retaining member 48, a window 52 and a shade assembly 56 positioned proximate the window 52. The shade assembly 56 includes a housing 60, and a shade 64 configured to extend from the housing 60 and retract to the housing 60. An engaging member 68 is positioned on the shade 64 and configured to couple with the retaining member 48 of the headliner 44. The photoluminescent structure 10 is positioned on the shade 64.

In the depicted example, the vehicle 40 is depicted as a sport utility vehicle, but it will be understood that the vehicle 40 may be a truck, van, sedan or other type of vehicle 40 without departing from the teachings provided herein. Further, although depicted in a second row seating position, the shade assembly 56 may additionally or alternatively be positioned in other rows of seating (e.g., front row seating, third row seating) of the vehicle 40. Even further, the shade assembly 56 may extend through a trunk or cargo space of the vehicle 40 without departing from the teachings provided herein. The vehicle 40 defines an interior 76 within which occupants of the vehicle 40 are positioned. The headliner 44 extends across the interior 76 of the vehicle 40. The headliner 44 may be a polymeric material, such as a glass mat thermoplastic, or other suitable material. As explained above, the retaining member 48 is positioned on the headliner 44. According to one example, the retaining member 48 may be a latch, a loop or other mechanical retaining device configured to couple with the engaging member 68 such that the shade 64 is supported from the headliner 44. In another example, the retaining member 48 may be a magnet or other electromagnetic device configured to retain the engaging member 68 to the headliner 44. It will be understood that although depicted with a single retaining member 48, the headliner 44 may include a plurality of retaining members 48 positioned across the headliner 44 (e.g., to engage a plurality of engaging members 68).

Figure 5:
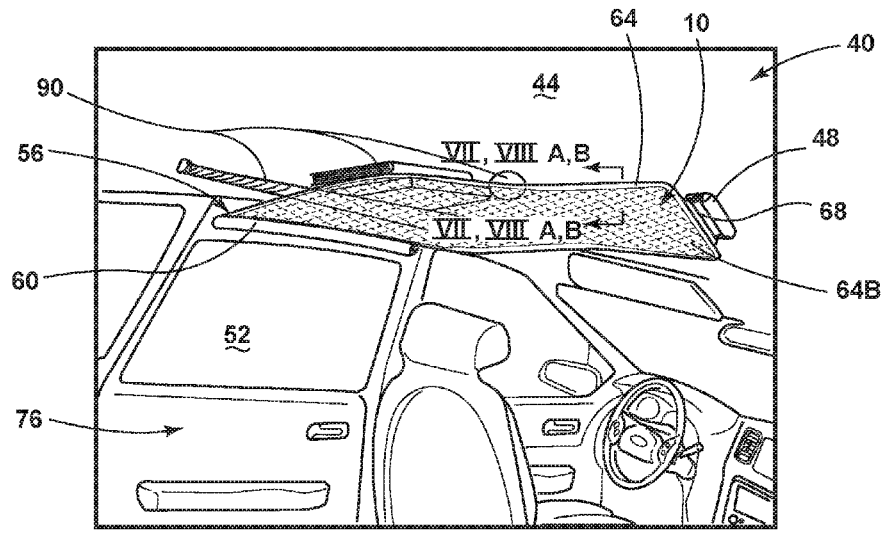
FIG. 5 is a perspective view of the shade assembly in an extended cargo position, according to one example.
Figure 6:
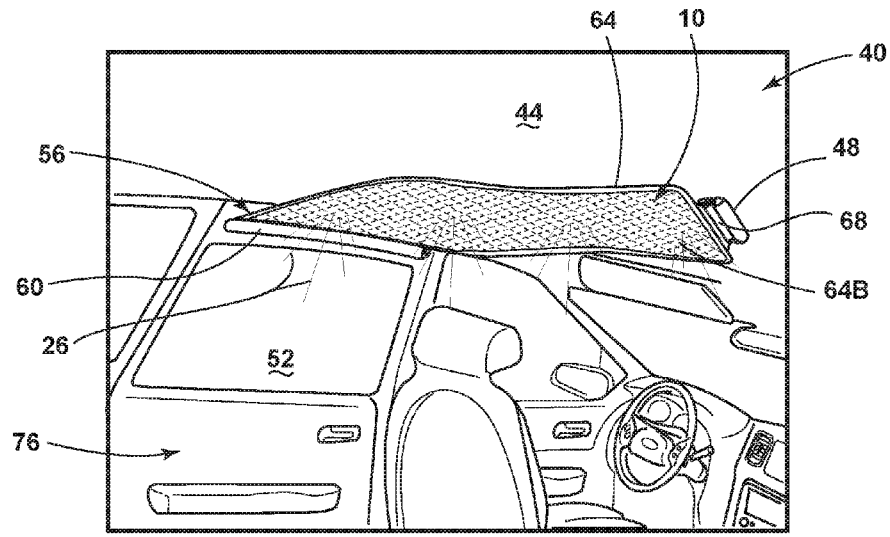
FIG. 6 is a perspective view of the shade assembly illuminating an interior of the vehicle, according to one example.

The shade assembly 56 includes the housing 60, the shade 64, the engaging member 68, and the photoluminescent structure 10. The shade assembly 56 is configured to allow the shade 64 to operate between an undeployed, or retracted, position (FIG. 3), and a variety of deployed positions. For example, the shade 64 may be deployed to a shade position (FIG. 4) or to a cargo position (FIGS. 5 and 6). The shade assembly 56 is positioned proximate the window 52. In the depicted example, the shade assembly 56 is positioned at a top of the window 52 although it will be understood that the shade assembly 56 may be positioned on sides or the bottom of the window 52. Further, it will be understood that the multiple shade assemblies 56 may be utilized at various points throughout the vehicle 40. In the depicted example, the housing 60 of the shade assembly 56 is a separate member from the headliner 44 into which the shade 64 may retracted and deploy from. In alternative examples, the housing 60 may be positioned within or behind the headliner 44 such that the housing 60 is not visible to occupants of the interior 76 of the vehicle 40. Further, the shade assembly 56 may utilize the headliner 44 has the housing 60 such that the shade 64 extends and retracts or deploys from the headliner 44. In examples where the housing 60 is positioned behind the headliner 44, the headliner 44 may define a locally compressed region where the thickness of the headliner 44 is decreased. Such an example may be advantageous in increasing the packaging space for the housing 60 without necessarily requiring an increase in the space of the interior 76 occupied by the headliner 44. The housing 60 may include one or more retraction systems for holding, retracting, and deploying the shade 64 from the housing 60. The retraction system may include a roller which is positioned within the housing 60 and/or behind the headliner 44. The roller may be torsionaly biased by a spring or the like to generate tension acting on the shade 64 in the deployed positions. The tension generated by the roller on the shade 64 may keep the shade 64 and the taught while in the deployed positions. Further, when the shade 64 is in the undeployed position (i.e., in the housing 60 or in the headliner 44) the engaging member 68 may be held tightly against the housing 60 and/or headliner 44 to prevent rattling while the vehicle 40 is in motion. The shade 64 may be wound around the roller and as such it may be advantageous for each component of the shade 64 to be flexible.

The shade 64 may be composed of a plastic material, an elastomeric material, a metal, or combinations thereof. The shade 64 may have a mesh structure (e.g., fine or course) of fibers, a film structure or a sheet structure. The shade 64, in mesh examples, may have a sufficiently fine structure to block light. In film or sheet examples, the shade 64 may be tinted or otherwise darkened to absorb light. In yet another example, the shade 64 may be formed from a partially or fully vacuum metalized sheet configured to reflect light. The shade 64 defines both an inboard surface 64A and an outboard surface 64B. In the depicted example, the photoluminescent structure 10 is positioned on the outboard surface 64B of the shade 64. It will be understood that the photoluminescent structure 10 may be positioned on both the outboard surface 64B and the inboard surface 64A or only the inboard surface 64A. The photoluminescent structure 10 is positioned on the shade 64 such the converted light 26 is substantially emitted in one direction (i.e., off of just the inboard surface 64A or outboard surface 64B). In some examples, a light blocking or reflective layer maybe positioned between the photoluminescent structure 10 and the shade 64 such that transmission of the converted light 26 through the shade 64 is minimized. The photoluminescent structure 10 may take a variety of patterns and configurations on the shade 64. For example, the photoluminescent structure 10 may include a decorative pattern (e.g., stripes, moons, stars, make and/or model information of the vehicle 40, messages, alpha numeric text and symbols, etc.). According to some examples, one or more reflective beads 80 may be positioned in or on the photoluminescent structure 10 as explained in greater detail below. Further, in various examples, the light source 84 may also be positioned on or proximate the photoluminescent structure 10.

Figure 3:
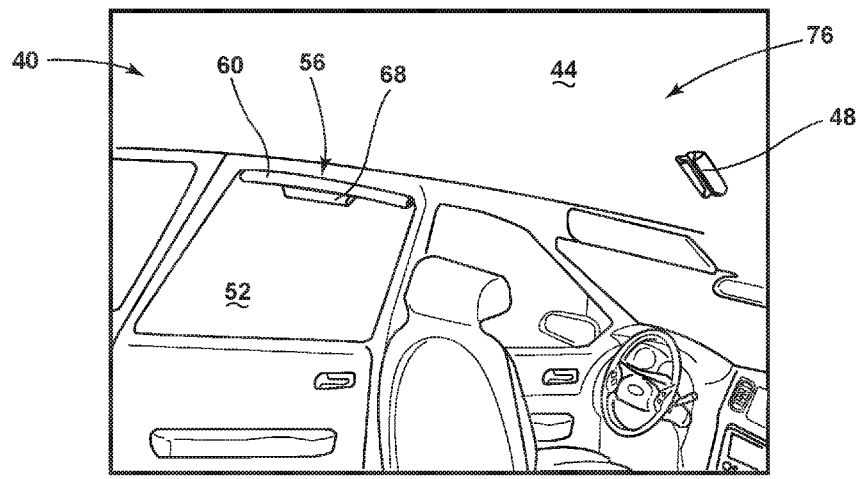
FIG. 3 is a perspective view of the shade assembly in an undeployed position, according to one example.
Figure 4:
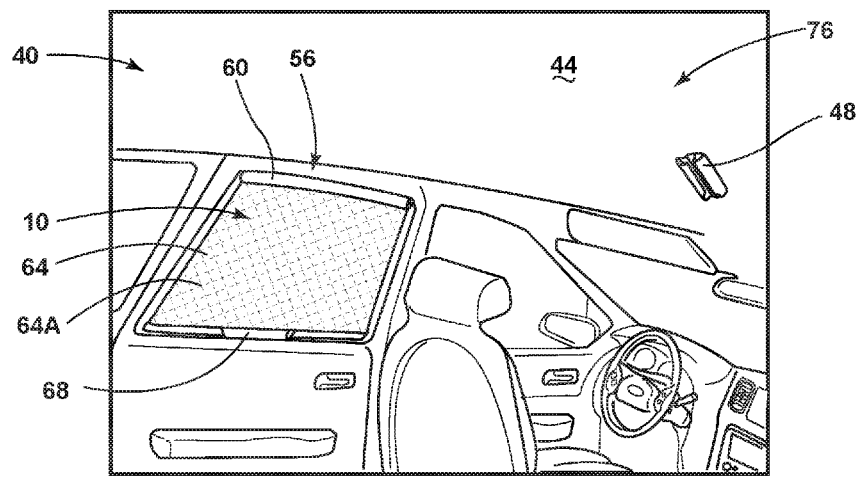
FIG. 4 is a perspective view of the shade assembly in an extended shade position, according to one example.

Referring now to FIGS. 3 and 4, the shade 64 is depicted in the retracted, or undeployed, position (FIG. 3) and in the shade position (FIG. 4). As explained above, the shade 64 of the shade assembly 56 may be used to block ambient sunlight from reaching occupants within the interior 76 of the vehicle 40. In fine mesh examples, as well as translucent or transparent sheet and film examples, of the shade 64, a portion of light may be allowed to be transmitted through the shade 64 and a portion of light to be blocked or absorbed by the shade 64 and/or the photoluminescent structure 10. When the shade 64 is in the shade position, the photoluminescent structure 10 may be charged from excitation light 24 present from the sun and/or ambient light sources (e.g., street lights) proximate the vehicle 40. In low ambient lighting conditions (e.g., night), converted light 26 maybe emitted from the photoluminescent structure 10 outwardly through the window 52 towards an exterior of the vehicle 40. The emission of light from the shade 64 through the window 52 may create a glare which decreases visibility into the vehicle 40 (i.e., for privacy), but correspondingly increases the visibility of the vehicle 40 (i.e., for safety). As explained above and below, the light source 84 may be used to emit light alone or in conjunction with the photoluminescent structure 10 through the window 52 when the shade 64 is deployed in the shade position. Further, use of the reflective beads 80 increases the reflectivity, and therefore the visibility, of the vehicle 40 when the shade 64 is in the shade position and there are low light ambient conditions around the vehicle 40.

Referring now to FIGS. 5 and 6, the shade 64 of the shade assembly 56 is depicted in the cargo position. In the cargo position, the shade 64 extends across the headliner 44 of the vehicle 40. As explained above, although depicted with a single retaining member 48 and a single engaging member 68, the headliner 44 and the shade 64 may include a plurality of retaining members 48 and engaging members 68, respectively. The retaining member 48 and/or the engaging member 68 may extend a width of the shade 64. Multiple retaining members 48 and/or engaging members may increase the stability of the shade 64 while in the cargo position. The shade 64 is configured to support a variety of objects 90 (e.g., paperwork, gloves, toys, books, etc.) proximate the headliner 44. The retraction system within the housing 60 of the shade assembly 56 may provide tension to the shade 64 such that the objects 90 are held against the headliner 44. Further, elastomeric material examples of the shade 64 may help to increase the tension and/or help conform to the shade 64 to the objects 90.

As explained above, if the shade 64 is in one of the deployed positions such that sunlight or ambient light falls on the photoluminescent structure 10, the photoluminescent structure 10 will be charged. In the cargo position, the photoluminescent structure 10 of the shade 64 may emit the converted light 26 into the interior 76 of the vehicle 40. In essence, the shade 64, when in the cargo position, may function to both hold the objects 90 as well as function as a dome light for the interior 76 of the vehicle 40. It will also be understood that the light source 84 of the shade 64 may also be activated to either charge the photoluminescent structure 10 and/or provide illumination to the interior 76 of the vehicle 40 as a dome light.

Figure 7:
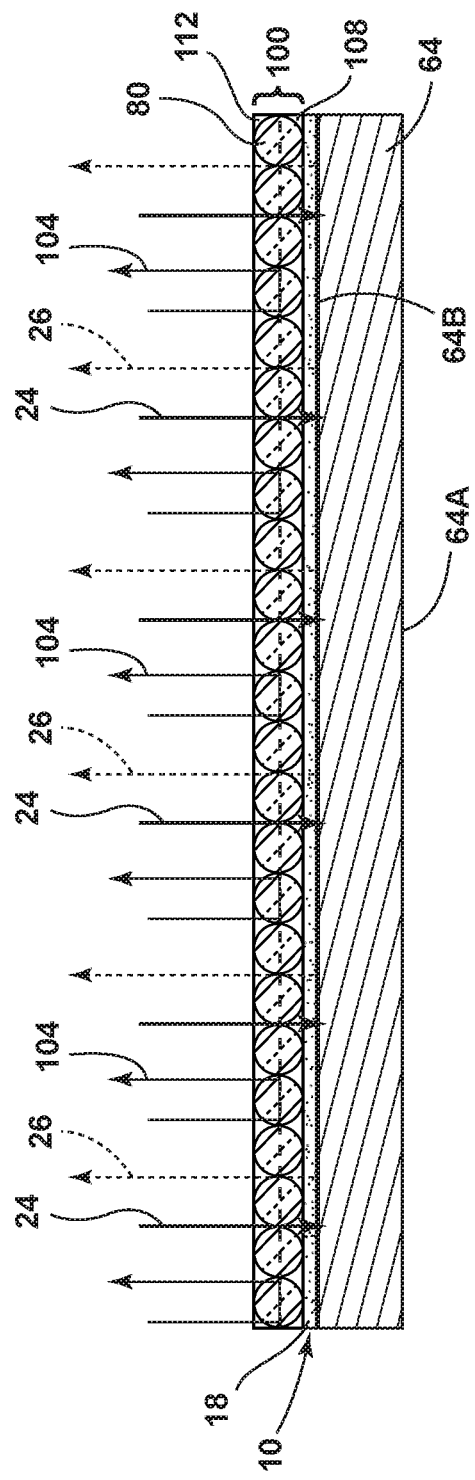
FIG. 7 is a cross-sectional view taken along the line VII-VII of FIG. 5, according to one example.

Referring now to FIG. 7, the photoluminescent structure 10 is positioned on the outboard side 64B of the shade 64. The photoluminescent structure 10 may be formed from a formulation in a liquid carrier medium and may be applied to the shade 64 by painting, screen-printing, spraying, slot coating, dip coating, roller coating, and bar coating, and/or any other method known in the art. To accomplish a desired coloring of outputted light from the shade 64, an oil based tintable liquid carrier containing the photoluminescent structure 10 therein may be utilized and can be tinted a desired color with a small addition of standard tints or through addition of a second photoluminescent material 18.

A reflective layer 100 may be disposed above the photoluminescent structure 10. The reflective layer 100 may include clear, translucent, and/or opaque portions and may be colored any desired color. The reflective layer 100 may include any reflective material that generally functions to reflect incident light 104 that is directed from the environment proximate the reflective layer 100.

It will be appreciated that the reflective layer 100 may be reflective and/or retroreflective. Accordingly, in examples where the reflective layer 100 has reflective properties, the incident light 104 may be spread, refracted, and/or scattered as the incident light passes therethrough. In examples where the reflective layer 100 has retroreflective properties, the incident light 104 directed towards the reflective layer 100 may redirect the incident light 104 in a substantially similar direction to the direction at which the incident light 104 approached the reflective layer 100.

According to one example, the reflective layer 100 is configured as a plurality of beads 80. The beads 80 may be formed from a glass material, a polymeric material, any other practicable material, and/or a combination thereof. The beads 80 may be reflective and/or retroreflective. Accordingly, the beads 80 and/or the photoluminescent structure 10 may spread, scatter, refract and/or reflect the incident light 104.

In some examples, a portion of the beads 80 may be a first material (e.g., a glass) and a second portion of the beads 80 may be a second material (e.g., a polymeric material). The beads 80 may have a solid construction, or may be hollow. In examples where the beads 80 have a hollow core, the internal void may include any type of material, solid, liquid, or gas, without departing from the teachings provided herein. It will be appreciated that in alternate examples, reflective materials other than beads 80 may be utilized within the reflective layer 100 without departing from the teachings provided herein.

According to one example, the material within the beads 80 may have a different refractive index than the material of the beads 80. The beads 80 may have a substantially spherical shape, an oblong shape, an irregular shape, or combinations thereof. The beads 80 may range in size from about 60 µm (0.0024 inches) to about 850 µm (0.034 inches). The bead size may be expressed in terms of U.S. Sieve number, or the size of mesh screen that a bead will pass through. For example, a U.S. Sieve Number 20 will permit beads 80 with a diameter of 840 µm (0.033 inches) or less to pass through the mesh, whereas a U.S. Sieve Number 200 mesh will allow those beads 80 of 74 µm (0.0029 inches) or less to pass. According to one example, the beads 80 may be chosen from 20 to 200 U.S. Sieve Number. The beads 80, according to one example, are substantially mono dispersed in size and/or shape. According to an alternate example, the beads 80 may be configured in a variety of sizes and/or shapes that are randomly distributed within a light transmissive adhesive material 108.

According to one example, the reflective layer 100 may contain over 10, 100 or 1000 beads 80 per square foot that are bonded to the photoluminescent structure 10, or any other component of the shade 64, within the light transmissive adhesive material 108. The beads 80 and/or adhesive material 108 may be printed onto the shade 64. Instead of scattering light, the beads 80 may reflect the incident light 104 (e.g., ambient light) and redirect the incident light 104 away from the reflective layer 100 thereby creating reflective characteristics. For the beads 80 to retroreflect light, the beads 80 may be partially transparent and substantially round. However, it will be understood that the beads 80 may be translucent and/or any other shape without departing from the scope of the present disclosure.

The transparency of the beads 80 may allow incident light 104, or ambient light, to pass into and be subsequently redirected out of the beads 80. As the incident light 104 enters the beads 80, it may be bent (refracted) by the rounded surface of the beads 80 to a point below where the beads 80 is embedded in the adhesive material 108. The incident light 104 striking the back of the beads 80 surface, which is embedded within the adhesive material 108, may then be reflected outwardly in a substantially convergent direction to which the incident light 104 entered the beads 80, with a fraction of the incident light 104 going back toward the photoluminescent structure 10. As discussed above, the incident light 104 may correspond to the excitation light 24, or contain a portion of excitation light 24 therein, thereby causing the photoluminescent structure 10 to luminesce.

The beads 80 may be applied to the photoluminescent structure 10 and/or any component of the shade 64 in a premixed solution, disposed into the wet adhesive material 108, dropped onto a premixed two-part epoxy or thermoplastic material, and/or through any other process known in the art. According to one example, the beads 80 may be embedded to about greater than about 10%, 20%, 30%, 40%, 50% or 60% of the diameter of the beads 80. In other words, a portion of the beads 80 may protrude from the adhesive material 108. It will be understood that multiple contiguous layers of beads 80 may be utilized within the paint such that some beads 80 are completely surrounded by the adhesive material 108 while other beads 80 may protrude. Moreover, in some examples, the beads 80 may be encapsulated in the adhesive material 108. The depth of the beads 80 within the adhesive material 108 may be consistent across the shade 64 or may vary across the shade 64 such that certain areas (e.g., symbols of text of the photoluminescent structure 10) are highlighted. In some examples, it may be desired to provide a consistent quality of both beads 80 and the adhesive material 108 to promote even retroreflectivity along the shade 64.

In some examples, when the incident light 104 is retroreflected, the retroreflected light 104 from the beads 80 may be a function of variables including the index of refraction of the beads 80; the shape of the bead 80, size, and surface characteristics; and the number of beads 80 present and exposed to incident light 104. The bead's 80 Refractive Index (RI) is a function of the chemical makeup of the beads 80. The higher the RI, the more incident light 104 that is retroreflected. According to one example, the beads 80 disposed on the reflective shade 64 have a refractive index in the range of about 1 to about 2.

The beads 80 may be disposed in an overmold material 112, which may be UV stable. The overmold material 112 may shield the photoluminescent structure 10 from the oxidizing action of the atmosphere and from moisture. According to one example, the overmold material 112 may also contain a water based polyurethane resin. The polyurethane resin (e.g., an acrylic urethane resin) used in the overmold material 112 is a thermoplastic polymer derived or produced by the reaction of a polyisocyanate such as a diisocyanate (toluene diisocyanate) and a hydroxyl-containing material. The overmold material 112 may therefore prevent, reduce, or minimize the flaking of the exposed surface of the reflective layer 100. The amount of water soluble polyurethane resin used ranges from about 3% to about 60%, by weight of the overmold material 112 composition, according to one example.

In operation, according to one example, the incident light 104 directed towards the shade 64 enters the reflective layer 100. A first portion of the incident light 104 is retroreflected by the reflective layer 100. A second portion of the incident light 104 may pass through the reflective layer 100 and enter the photoluminescent structure 10. The incident light 104 may correspond, or include the excitation light 24. The photoluminescent material 18 is formulated to become excited upon receiving excitation light 24 of a specific wavelength from any excitation source, such as the sun or any artificial light source. As a result, the excitation light 24 undergoes an energy conversion process and is re-emitted at a different wavelength as the converted light 26. According to one example, the photoluminescent material 18 may be formulated to convert excitation light 24 into a longer wavelength light, otherwise known as down conversion. Alternatively, the photoluminescent material 18 may be formulated to convert excitation light 24 into a shorter wavelength light, otherwise known as up conversion. Under either approach, light converted by the photoluminescent material 18 may be immediately outputted from the photoluminescent structure 10 or otherwise used in an energy cascade, wherein the converted light 26 serves as excitation light 24 to excite another formulation of photoluminescent material 18 located within the energy conversion layer 16, whereby the subsequent converted light 26 may then be outputted from the photoluminescent structure 10 or used as excitation light 24, and so on. With respect to the energy conversion processes described herein, the difference in wavelength between the excitation light 24 and the converted light 26 is known as the Stokes shift and serves as the principle driving mechanism for an energy conversion process corresponding to a change in wavelength of light.

In one example, the energy conversion process is undertaken by way of down conversion, whereby the excitation light 24 includes light on the lower end of the visible spectrum such as blue, violet, or ultraviolet (UV) light. Doing so enables natural incident light 104, such as sun light, to be used as the excitation source. Accordingly, the shade 64 may produce a daytime luminescence, reflectivity, and/or coloration. In addition, the photoluminescent structure 10 may emit converted light 26 at night when light (i.e., head lights of an automobile) shine on the photoluminescent structure 10. Moreover, according to one example, a long-persistence photoluminescent material 18 may be disposed within the photoluminescent structure 10 such that the shade 64 continues to emit light for long periods of time once excitation light 24 is no longer present. As discussed above, the long persistence photoluminescent material 18, according to one example, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some examples, for a period substantially longer than 60 minutes (e.g., the period may extend 24 hours or longer, and in some instances, the period may extend 48 hours). Accordingly, the long persistence photoluminescent material 18 may continually illuminate in response to excitation from any of the light source 84 (FIG. 8A) that emits the excitation light 24, including, but not limited to, natural light sources (e.g., the sun) and/or any artificial light source. The periodic absorption of the excitation light 24 from any excitation source may provide for a substantially sustained charge of the long persistence photoluminescent material 18 to provide for consistent passive illumination.

It will be understood that although the reflective characteristics of the shade 64 are described in connection with the reflective layer 100, the shade 64 may exhibit substantially similar or the same reflectiveness if the beads 80 are disposed within the photoluminescent structure 10. It will further be understood that all applicable parameters described in connection to the beads 80 within the reflective layer 100 may apply equally to the photoluminescent structure 10.

Figure 8A:
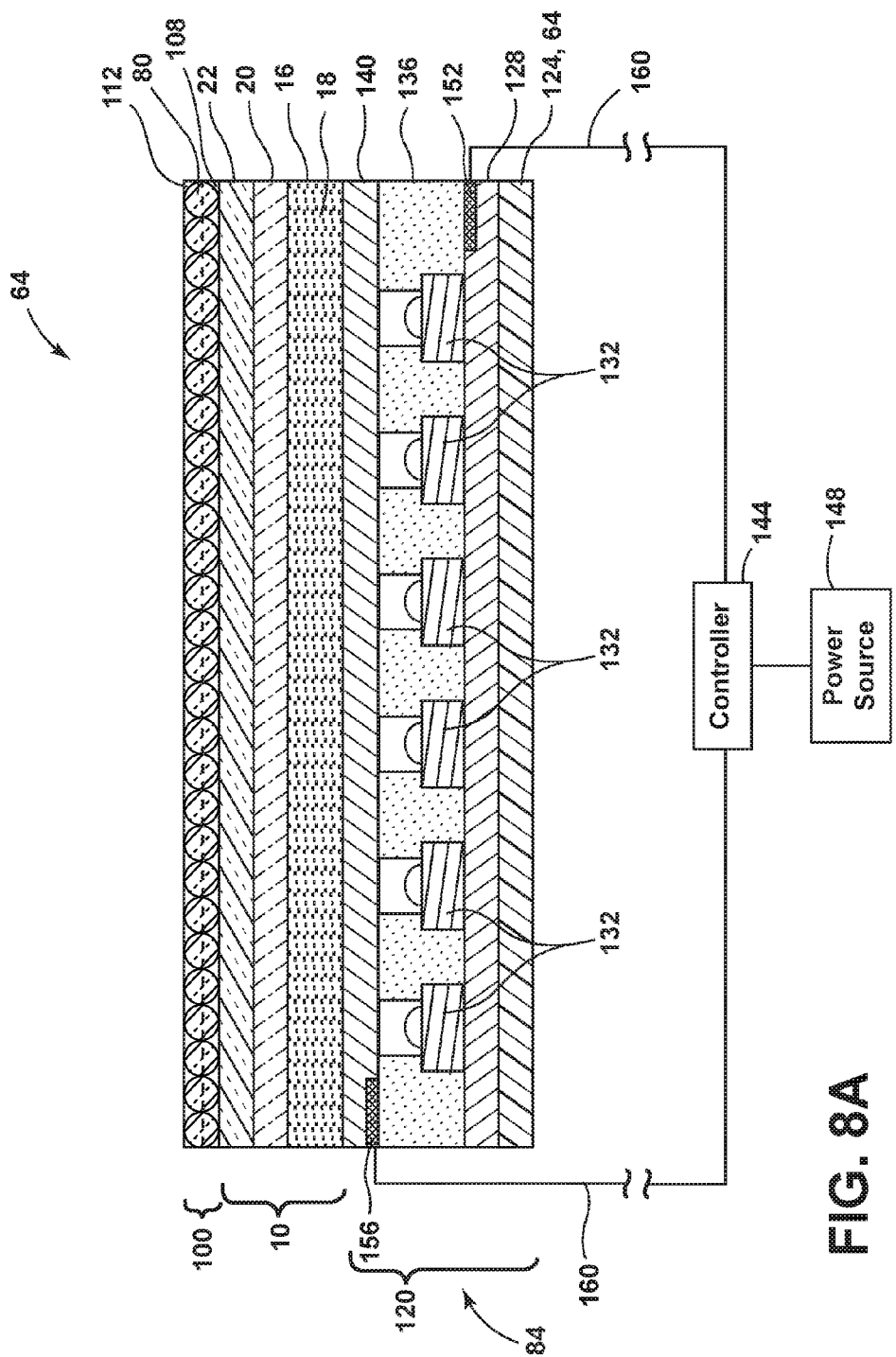
FIG. 8A is a cross-sectional view taken along line VIII-VIII of FIG. 5 illustrating a light source according to one example.

Referring now to FIG. 8A, a cross-sectional view of an alternate example of the shade 64 taken along the line VIIIA-VIIIA of FIG. 5 is shown. As illustrated in FIG. 8A, the shade 64 may have a stacked arrangement and includes the light source 84 shown as a light-producing assembly 120 disposed between the photoluminescent structure 10 and a base layer 124.

The light-producing assembly 120 may correspond to a thin-film or printed light emitting diode (LED) assembly and includes the base layer 124 as its lowermost layer. The base layer 124 may include a polycarbonate, poly-methyl methacrylate (PMMA), polyester, polypropylene, or polyethylene terephthalate (PET) material, or any other practicable material, on the order of 0.005 to 0.060 inches thick. Alternatively, as a cost saving measure, the base layer 124 may correspond to any pre-existing vehicle structure (i.e., the shade 64) and may be formed of any practicable material, including a glass filled polymeric material.

The light-producing assembly 120 also includes a positive electrode 128 arranged over the base layer 124. The positive electrode 128 includes a conductive epoxy such as, but not limited to, a silver-containing or copper-containing epoxy. The positive electrode 128 is electrically connected to at least a portion of a plurality of LED sources 132 arranged within a semiconductor ink 136 and applied over the positive electrode 128. Likewise, a negative electrode 140 is also electrically connected to at least a portion of the LED sources 132. The negative electrode 140 is arranged over the semiconductor ink 136 and includes a transparent or translucent conductive material such as, but not limited to, indium tin oxide. Additionally, each of the positive and negative electrodes 128, 140 are electrically connected to a controller 144 and a power source 148 via a corresponding bus bar 152, 156 and conductive leads 160. The bus bars 152, 156 may be printed along opposite edges of the positive and negative electrodes 128, 140 and the points of connection between the bus bars 152, 156 and the conductive leads 160 may be at opposite corners of each bus bar 152, 156 to promote uniform current distribution along the bus bar 152, 156.

The LED sources 132 may be dispersed in a random or controlled fashion within the semiconductor ink 136 and may be configured to emit focused or non-focused light toward the photoluminescent structure 10. The LED sources 132 may correspond to micro-LEDs of gallium nitride elements on the order of 5 to 400 microns in size and the semiconductor ink 136 may include various binders and dielectric material including, but not limited to, one or more of gallium, indium, silicon carbide, phosphorous, and/or translucent polymeric binders. In this manner, the semiconductor ink 136 may contain various concentrations of LED sources 132 such that the density of the LED sources 132 may be adjusted for various lighting applications.

The semiconductor ink 136 can be applied through various printing processes, including ink jet and silkscreen processes to selected portion(s) of the positive electrode 128. Thus, it is envisioned that the LED sources 132 are dispersed within the semiconductor ink 136, and shaped and sized such that a substantial quantity of the LED sources align with the positive and negative electrodes 128, 140 during deposition of the semiconductor ink 136. The portion of the LED sources 132 that ultimately are electrically connected to the positive and negative electrodes 128, 140 may be illuminated by a combination of the bus bars 152, 156, controller 144, power source 148, and conductive leads 160. According to one example, the power source 148 may correspond to a vehicular power source operating at 12 to 16 VDC. Additional information regarding the construction of light-producing assemblies is disclosed in U.S. Pat. No. 9,299,887 to Lowenthal et al., entitled "ULTRA-THIN PRINTED LED LAYER REMOVED FROM SUBSTRATE," the entire disclosure of which is incorporated herein by reference.

Referring still to FIG. 8A, the photoluminescent structure 10 is arranged over the negative electrode 140 as a coating, layer, film or other suitable deposition. With respect to the presently illustrated example, the first photoluminescent structure 10 may be arranged as a multi-layered structure including the energy conversion layer 16, optional stability layer 20, and optional protective layer 22, as described above. The photoluminescent structure 10 may contain the long persistent photoluminescent material 18.

The reflective layer 100 is disposed over the photoluminescent structure 10 and may be at least partially light transmissible. In this manner, the reflective layer 100 may be illuminated by the photoluminescent structure 10 or the light-producing assembly 120 when the LED sources 132 are illuminated.

Figure 8B:
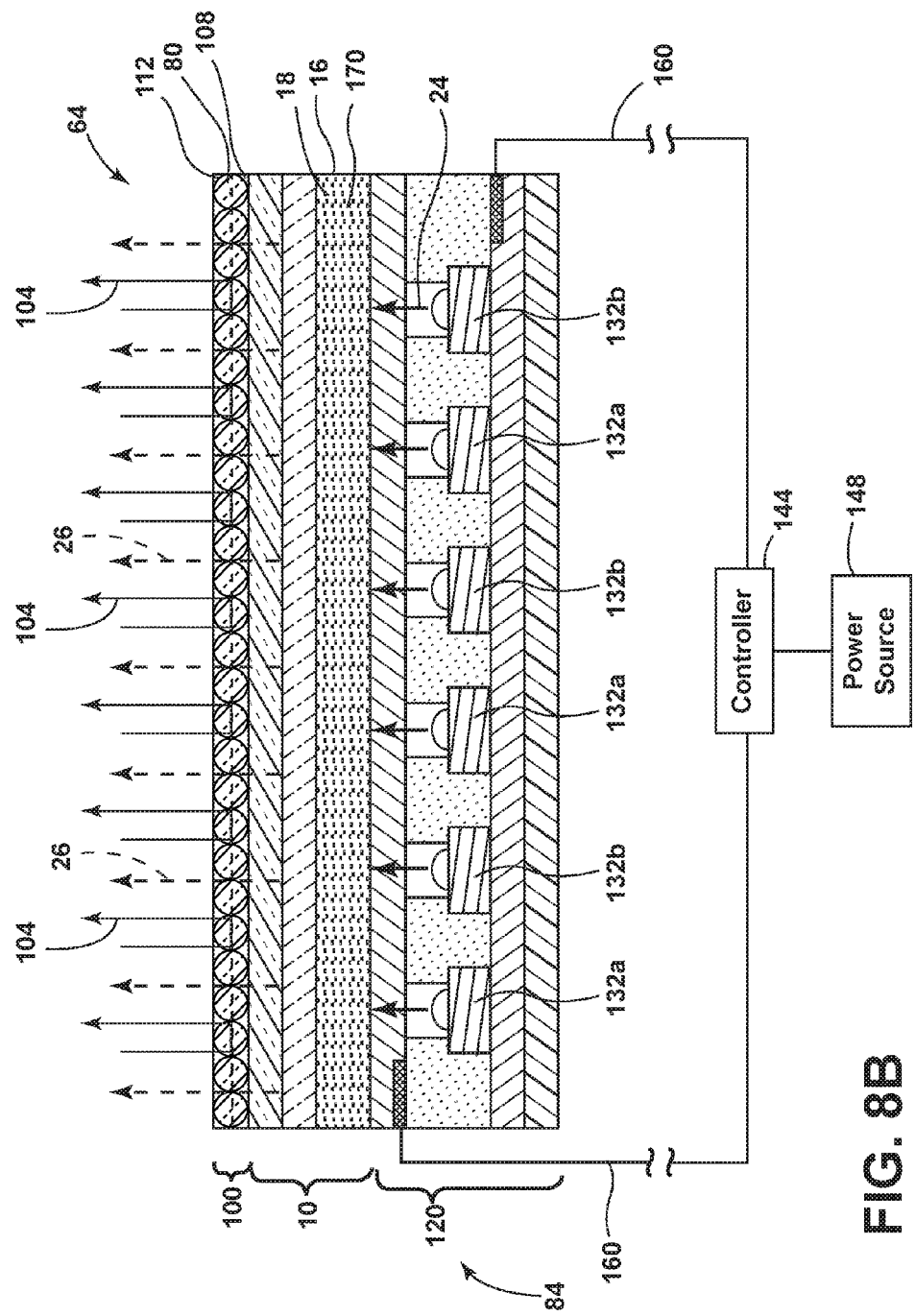
FIG. 8B is a cross-sectional view taken along line VIII-VIII of FIG. 5 further illustrating the light source, according to one example.

Referring to FIG. 8B, an energy conversion process for generating multiple colors of light is illustrated according to one example. For consistency, the energy conversion process is also described below using the shade 64 depicted in FIG. 8A. In this example, the energy conversion layer 16 includes two different photoluminescent materials 18, 170. Alternatively, the photoluminescent materials 18, 170 may be isolated from each other if desired. Also, it should be appreciated that the energy conversion layer 16 may include more than two different photoluminescent materials 18, 170, in which case, the teachings provided below similarly apply. In one example, the energy conversion process occurs by way of down conversion using blue, violet, and/or UV light as the source of excitation.

With respect to the presently illustrated example, the excitation of photoluminescent materials 18 and 10 are mutually exclusive. That is, photoluminescent materials 18 and 170 are formulated to have non-overlapping absorption spectrums and Stoke shifts that yield different emission spectrums. Also, in formulating the photoluminescent materials 18, 170, care should be taken in choosing the associated Stoke shifts such that the converted light 26 emitted from one of the photoluminescent materials 18, 170 does not excite the other, unless so desired.

According to one exemplary example, a first portion of the LED sources 132, exemplarily shown as LED sources 132A, is configured to emit an excitation light 24 having an emission wavelength that only excites photoluminescent material 18 and results in the excitation light 24 being converted into a visible light of a first color. Likewise, a second portion of the LED sources 132, exemplarily shown as LED sources 132B, is configured to emit an excitation light 24 having an emission wavelength that only excites photoluminescent material 170 and results in the excitation light 24 being converted into a visible light of a second color.

The first and second colors may be visually distinguishable from one another. In this manner, LED sources 132A and 132B may be selectively activated using the controller 144 to cause the photoluminescent structure 10 to luminesce in a variety of colors. For example, the controller 144 may activate only LED sources 132A to exclusively excite photoluminescent material 18, the shade 64 illuminating in the first color. Alternatively, the controller 144 may activate only LED sources 132B to exclusively excite photoluminescent material 170, resulting in the shade 64 illuminating in the second color. Alternatively still, the controller 144 may activate LED sources 132A and 132B in concert, which causes both of the photoluminescent materials 18, 170 to become excited, resulting in the shade 64 illuminating in a third color, which is a color mixture of the first and second color. For energy conversion layers 16 containing more than two distinct photoluminescent materials, a greater diversity of colors may be achieved. Contemplated colors include red, green, blue, and combinations thereof including white, all of which may be achieved by selecting the appropriate photoluminescent materials and correctly manipulating their corresponding LED sources.

Figure 9:
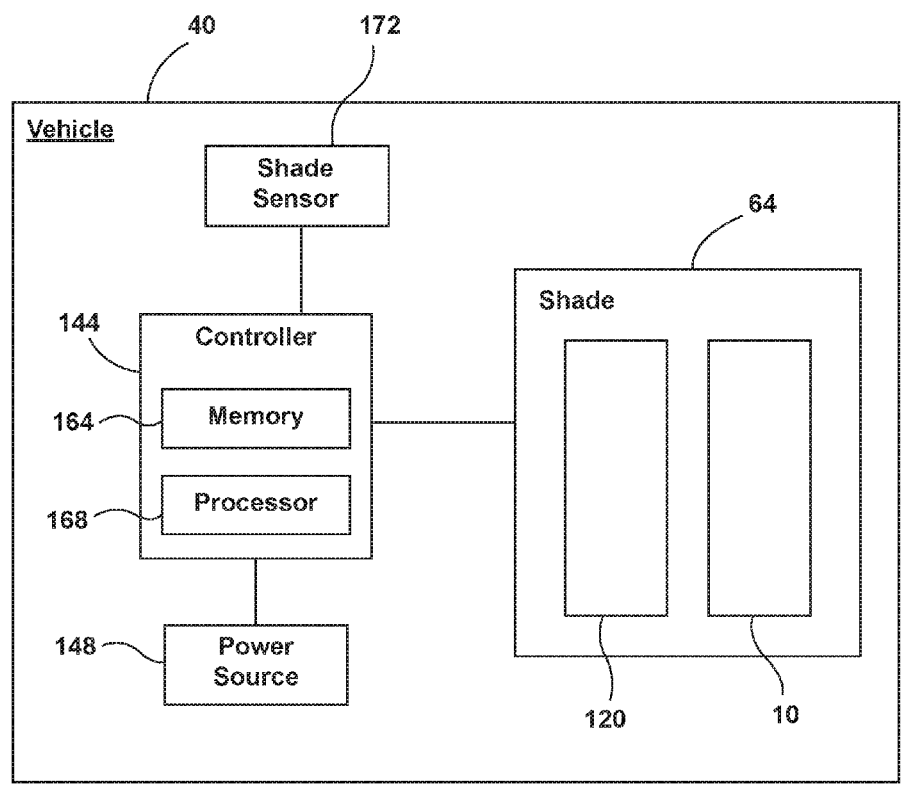
FIG. 9 is a block diagram of the vehicle, according to one example.

Referring now to FIG. 9, depicted is a box diagram of the vehicle 40 in which the shade 64 is implemented. The vehicle 40 includes the controller 144 in communication with the light producing assembly 120. The controller 144 may include a memory 164 having instructions contained therein that are executed by a processor 168 of the controller 144. The controller 144 may provide electrical power to the shade 64 via the power source 148 located onboard the vehicle 40. In addition, the controller 144 may be configured to control the light output of the light source 84 based on feedback received from a shade sensor 172. The shade sensor 172 may be a motion sensor (e.g., to detect deployment of the shade 64) or a light sensor to detect an amount of light emitted by the photoluminescent structure 10. The memory 164 may include a variety of routines configured to vary the color and intensity emitted by the light source 84. For example, the light source 84 may be activated when the shade sensor 172 detects that the shade 64 has not been deployed in a predetermined amount of time or that the intensity of light emitted from the photoluminescent structure 10 has fallen below a predetermined level. Both instances may indicate that the photoluminescent structure 10 needs to be charged by the light source 84. In another example, the shade sensor 172 may detect whether the shade 64 is in the shade position or the cargo position and alter the intensity of light from the light source 84 accordingly (e.g., higher intensity for glare and privacy, softer intensity for dome lighting). In yet another example, the memory 164 may include a routine to alter the color, intensity and flashing pattern of the light source 84 based on sensed driving conditions. For example, the light source 84 of the shade 64 may function as a running light by emitting amber light out of the window 52. The light source 84 may also function as an auxiliary turn signal by flashing light out of the window 52 when the vehicle 40 is making a turn.

It will be understood that the foregoing description of the light-producing assembly 120 may be applied to form a single continuous light source 84 and/or a plurality of individual light sources 84. In examples where there are a plurality of light sources 84, some or all of the light sources 84 may be independently electrically connected (e.g., through a conductive ink). In independently electrically connected examples of the light sources 84, each of the light sources 84 may be independently addressable, which may allow the controller 144 to create static and dynamic patterns of light on the shade 64 by independently illuminating certain light sources 84 and not others. Further, some, or all, of the light sources 84 may be covered by a single portion of the photoluminescent structure 10. Formation of the plurality of light sources 84 using a plurality of light-producing assemblies 120 may be accomplished in a similar manner to that as described in connection with the lightplate of U.S. Patent Application Publication No. 2015/0136573 filed on Oct. 6, 2014 the disclosure of which is hereby incorporated herein in its entirety. Further, the light producing assembly 120 and/or light source(s) 84 may be formed, and obtain the same or similar advantages as described above, through the placement and securement of a plurality of light sources on a flexible substrate as described in U.S. Patent Application Publication No. 2016/0276205 filed on Nov. 12, 2015 which is hereby incorporated herein in its entirety.

Use of the present disclosure may offer a variety of advantages. First, use of the illuminated shade 64 may increase the privacy and safety of the vehicle 40 by emitting both reflected and converted light 26 out of the window 52 of the vehicle 40 such that viewers cannot see into the vehicle 40, but the vehicle 40 is more visible. Second, the shade 64 may be utilized to store the objects 90 in an innovative and space saving manner. Third, the shade 64 may provide a large dome lighting to the interior 76 of the vehicle 40 which may not require power. As such, shade 64 may be utilized as a dome light for the vehicle 40 even when the vehicle 40 lacks electrical power (e.g., dead battery). Fourth, the shade 64 may protect occupants of the vehicle 40 from harmful sun rays.

Modifications of the disclosure will occur to those skilled in the art and to those who make or use the disclosure. Therefore, it is understood that the examples shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary examples of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary examples, is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. A vehicle, comprising:
a headliner including a retaining member;
a window positioned on a door; and a shade assembly positioned proximate the window, comprising:
- a shade configured to deploy from a housing and comprising an engaging member configured to couple with the retaining member; and
- a photoluminescent structure positioned on the shade, wherein the shade is configured to deploy to a shade position over the window and a cargo position extending across the headliner.

2. The vehicle of claim 1, wherein the photoluminescent structure is configured to emit light through the window when in the shade position.

3. The vehicle of claim 1, wherein the photoluminescent structure is configured to emit light into an interior of the vehicle in the cargo position.

4. The vehicle of claim 3, wherein the shade is configured to be deployed across the headliner in the cargo position.

5. The vehicle of claim 1, wherein the photoluminescent structure is patterned.

6. A vehicle, comprising:
- a window;
- a headliner positioned above the window; and
- a shade assembly positioned on a door, the shade assembly comprising:
  - a housing;
  - a shade configured to deploy from the housing on the door to engage a retention feature on the headliner; and
  - a photoluminescent structure positioned on the shade.

7. The vehicle of claim 6, wherein the photoluminescent structure includes a long persistent photoluminescent material therein.

8. The vehicle of claim 6, wherein the shade defines inboard and outboard surfaces, wherein the photoluminescent structure is positioned on the outboard surface of the shade.

9. The vehicle of claim 8, wherein the shade is configured to support cargo on the inboard surface of the shade.

10. The vehicle of claim 6, wherein the shade comprises a mesh structure.

11. The vehicle of claim 6, wherein the shade further comprises a plurality of reflective beads positioned on an outboard surface of the shade.

12. The vehicle of claim 6, wherein the shade comprises a light source.

13. A shade assembly for a vehicle, comprising:
- a housing positioned proximate a door window;
- a shade configured to deploy from the housing to a shade position over the door window and a cargo position coupled to a vehicle headliner; and
- a photoluminescent structure positioned on the shade.

14. The shade assembly of claim 13, wherein the shade defines inboard and outboard surfaces, wherein the photoluminescent structure is positioned on the outboard surface of the shade.

15. The shade assembly of claim 14, wherein the photoluminescent structure is configured to emit light through the window of the vehicle when the shade is deployed to the shade position.

16. The shade assembly of claim 15, wherein the photoluminescent structure is configured to emit light into an interior of the vehicle when the shade is deployed to the cargo position.

17. The shade assembly of claim 16, wherein the shade further comprises a plurality of reflective beads.

* * * * *